Patented Dec. 30, 1947

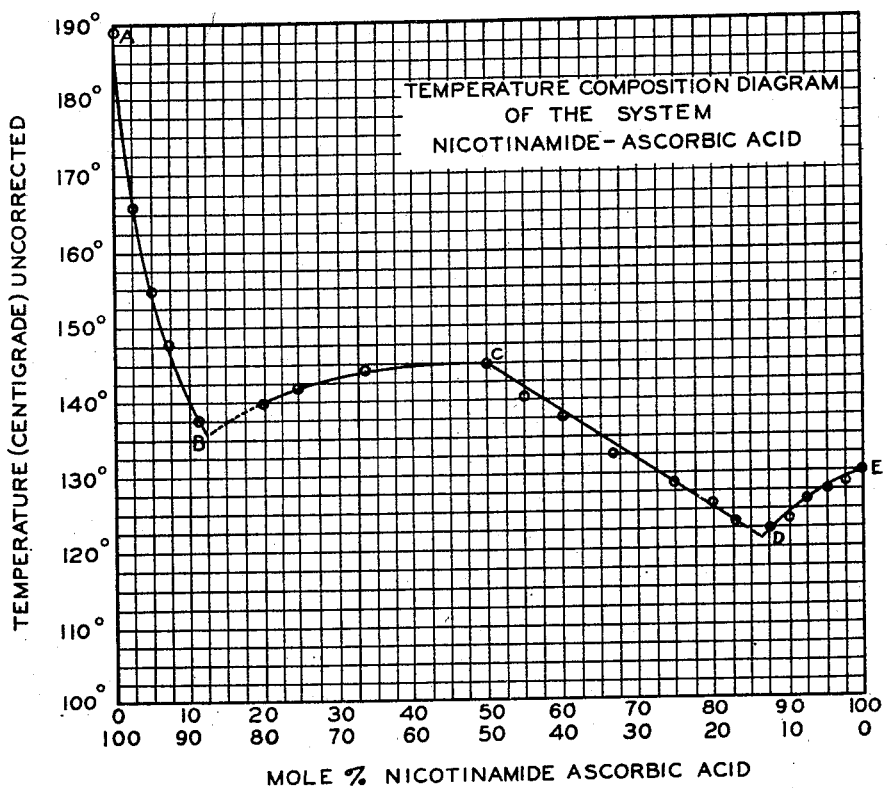

2,433,688

UNITED STATES PATENT OFFICE 2,433,688

MULTIVITAMIN PREPARATION AND METHOD OF PRODUCING SAME

Sereck H. Fox, Birmingham, and Laurene Paterson Opferman, East Detroit, Mich., assignors, by mesne assignments, to Gelatin Products Corporation, Detroit, Mich., a corporation of Michigan Application May 31, 1943, Serial No. 489,198

4 Claims. (Cl. 167—81)

1

This invention relates to an improved pharmaceutical preparation and method of producing same.

An object is to provide a pharmaceutical preparation, which includes vitamin C derived from ascorbic acid, in proper dosage amount, so compounded as not to lose the vitamin C potency either during compounding or throughout a long period of time thereafter.

Another object includes the provision of a pharmaceutical preparation of a multi-vitamin nature which includes vitamin C from ascorbic acid, and nicotinamide, and which is so prepared that the vitamin C retains its potency without appreciable loss, notwithstanding the presence of the nicotinamide. Such multi-vitamin products also frequently include a vegetable oil or oils and a small amount of water and this improved preparation is of such a character that the ascorbic acid vitamin C potency is maintained notwithstanding the presence of such ingredients.

Included in the objects of the invention is the preparation of a reaction product of ascorbic acid and nicotinamide, which exhibits the desired vitamin characteristics of ascorbic acid and nicotinamide without appreciable loss of the individual potencies of the reactants and which further possesses a vitamin C stability in excess of that of ascorbic acid alone under the same conditions. An important characteristic is the vitamin C stability of the ascorbic acid is retained within a multi-vitamin product wherein nicotinamide is present.

The use of ascorbic acid in pharmaceutical dosage forms has often heretofore been attended with serious loss of vitamin C potency. Such deterioration has been particularly troublesome in multi-vitamin products such as multi-vitamin tablets, multi-vitamin pills, and multi-vitamin capsules. Such products have exhibited loss of vitamin C potency of the ascorbic acid due to oxidation and particularly where there was exposure to water or moist air. Apparently water has had a pronounced effect in aggravating incompatibility.

Again, loss of ascorbic acid vitamin C potency has often resulted from the simple addition of the ascorbic acid to vegetable oils, singly or in mixture of the same. This is probably due to the small amount of peroxide contained in such oils and which attack the ascorbic acid regardless of the precautions taken in the compounding of the product, such as preparation within an inert atmosphere. Loss of vitamin C potency has therefore arisen not only as a result of long standing of the product following its preparation but has also occurred during the preparation.

Nicotinamide, the amide of nicotinic acid, often referred to as niacinamide, is an ingredient commonly included in multi-vitamin preparations along with ascorbic acid. In the presence of water, nicotinamide exhibits a pH value of 7.0 or higher. Ascorbic acid, on the other hand, in the presence of water exhibits a pH value usually below 4.0 and is most stable when the pH is not permitted to exceed 4.0. Mixtures, including nicotinamide and ascorbic acid tend, therefore, toward incompatibility particularly when water is present, and loss of ascorbic acid vitamin C potency results.

In the compounding of multi-vitamin mixtures, including ascorbic acid and nicotinamide, not only are the ingredients frequently exposed to moisture but such moisture exposure is apt to result from atmospheric humidity following preparation of the product and during storage.

Further, in the manufacture of multi-vitamin capsules, the most satisfactory form of dosage administration, it is common practice to suspend or mix such substances as thiamin hydrochloride, riboflavin, ascorbic acid, nicotinamide, pyridoxine hydrochloride, calcium pantothenate, and a fish liver oil with diluting substances such as vegetable oils, hydrogenated vegetable oils, waxes, tartaric acid, etc., in which environment the ascorbic acid is exposed to deteriorating influences. Ascorbic acid is a costly vitamin product and maintenance of its stability is important.

Multi-vitamin capsule content mixtures such as the following are representative in the industry:

A

| | Grams |
|---|---|
| Fish liver oil | .090 |
| Vitamin D concentrate | .002 |
| Thiamin hydrochloride, USP | .00165 |
| Ascorbic acid, USP | .0330 |
| Riboflavin, USP | .0022 |
| Nicotinamide, USP | .022 |
| Pyridoxine hydrochloride | .0002 |
| Calcium pantothenate | .004 |
| Yeast standard brands | .005 |
| Tartaric acid, USP | .010 |
| Lecithin, soy | .004 |
| Hydrogenated cottonseed oil | .003 |
| Beeswax, yellow, USP | .003 |
| Partially hydrogenated vegetable oil | .018 |

B

| | Grams |
|---|---|
| Fish liver oil | .018 |
| Vitamin D concentrate | .00125 |
| Thiamin hydrochloride, USP | .00115 |
| Ascorbic acid, USP | .0345 |
| Tartaric acid, USP | .010 |
| Nicotinamide, USP | .011 |
| Yeast, standard brands | .015 |
| Hydrogenated cottonseed oil | .002 |
| Beeswax, yellow, USP | .002 |
| Partially hydrogenated vegetable oil | .014 |
| Lecithin, soy | .003 |
| Riboflavin | .002 |

C

| | Grams |
|---|---|
| Fish liver oil | .103 |
| Vitamin D concentrate | .00125 |
| Riboflavin, USP | .002 |
| Thiamin hydrochloride, USP | .001 |
| Pyridoxine hydrochloride | .00005 |
| Calcium pantothenate | .006 |
| Nicotinamide, USP | .022 |
| Ascorbic acid, USP | .055 |
| Yeast, I. V. C | .090 |
| Tartaric acid, USP | .010 |
| Partially hydrogenated vegetable oil | .010 |
| Hydrogenated cottonseed oil | .0025 |
| Beeswax, yellow, USP | .0025 |
| Lecithin, soy | .003 |

The hydrogenated cottonseed oil listed in the above formulas is a substantially fully hydrogenated cottonseed oil (iodine value not over 8) in flake form. The partially hydrogenated vegetable oil is such an oil having an iodine value of 60 to 70 in plastic form. The vegetable oils commonly used in its manufacture are cottonseed oil, soybean oil, peanut oil, and corn oil.

Following compounding, such mixtures gradually thicken over a period of hours and the flowing and pumping thereof, necessary for their capsulation, becomes increasingly difficult. It has been discovered that this increasing vicosity is due to the interaction of the ascorbic acid and nicotinamide, which while somewhat inhibited by the oil film surrounding the particles, nevertheless proceeds.

We have discovered that it is possible to form a new compound of ascorbic acid and nicotinamide, which may probably be properly termed an "addition compound" or possibly a chemical salt-like compound and which may be denominated nicotinamide ascorbate. This compound may be prepared by mixing, in the dry state, ascorbic acid and nicotinic acid amide. The drawing illustrates a melting point composition curve of the reaction compound herein described.

This compound may be prepared by mixing nicotinamide and ascorbic acid in the ratio of mole to mole or, as often termed, the mole ratio of 1 to 1, until the reaction is completed. The reaction may be carried out by thoroughly mixing the ingredients in the dry state in a suitable mixing machine though the time of reaction may be considerably shortened if the mixture is moistened with suitable solvents such as water, acetone, or various alcohols. If solvents are used to shorten the reaction time these solvents may be driven off to reduce the resulting product to the dry form. This removal of the solvents may be accomplished at low temperatures or under vacuum if desired. The product of reaction is in the form of a hard cake which is ground or powdered. The ingredients in the dry state may be fused together if desired and the product of reaction may be powdered.

The product of reaction is canary yellow in color as compared with substantial white color for each of the two constituents. The melting point composition curve of the drawing constitutes proof of the formation of a reaction compound in the mixture of nicotinamide and ascorbic acid with maximum production in the mole to mole ratio as exhibited at point C at approximately the temperatures indicated.

The reaction product is shown by the curve of the drawing as having a definite and different melting point from that of either of its constituents. The melting point of the new compound is from 141.7° to 144.7° C. It is noted that this melting point range is higher than the melting point of one of the constituents.

Such reaction product herein termed nicotinamide ascorbate is believed to have the following structural formula:

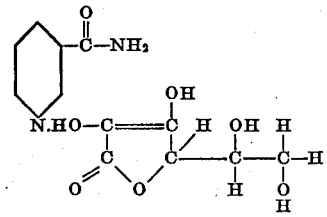

It is believed that similar reaction products will be formed when ascorbic acid is mixed in the proper proportions with other vitamin ring compounds containing nitrogen in the ring, such nitrogen being devoid of side chains, such as thiamin hydrochloride.

We have discovered that if the new compound, here termed nicotinamide ascorbate, is used in preparation of multi-vitamin mixtures of the character hereinabove described, instead of using the two separate ingredients, nicotinamide and ascorbic acid, that such mixtures exhibit much less viscosity and are much more easily flowed or pumped. The physical properties of such mixtures for capsulation are therefore enhanced.

It has also been found that this new compound, nicotinamide ascorbate, exhibits an assay recovery value, as to each of the two vitamin substances, ascorbic acid and nicotinic acid amide, substantially equivalent to the maximum theoretical value of each. The ascorbic acid portion of the molecule is substantially stable and retains such stability within the multi-vitamin environment wherein ascorbic acid when used alone deteriorates. Laboratory tests have indicated a stability as to vitamin C potency of a mixture such as (A) set forth hereinabove, wherein .058 gm. of nicotinamide ascorbate was used instead of the two substances, ascorbic acid and nicotinamide above listed, for a period of three weeks without measurable diminution. The vitamin C potency of such mixture using the two substances as set forth in the above formula was, on the other hand, found to deteriorate to an appreciable extent throughout the same period of time.

We claim:

1. That process of incorporating nicotinamide and ascorbic acid in a fluid multi-vitamin mixture which includes the step of first reacting the ascorbic acid and the nicotinamide together and thereafter incorporating the reaction product in the mixture.

2. That process of incorporating nicotinamide and ascorbic acid in a fluid multi vitamin mixture which includes the step of first reacting the ascorbic acid and the nicotinamide together in a mole ratio of 1 to 1 and thereafter incorporating the reaction product in said mixture.

3. That process of incorporating nicotinamide and ascorbic acid in a fluid multi vitamin mixture which includes the step of first reacting the ascorbic acid and the nicotinamide together, and reducing the reaction product to a dry powder form and thereafter incorporating such reaction product in said mixture.

4. A multi-vitamin preparation comprising preformed nicotinamide ascorbate and other vitamins, the nicotinamide ascorbate being present in therapeutically effective amounts and rendering said preparation stable with respect to the ascorbic acid vitamin C potency over long periods of standing.

SERECK H. FOX.
LAURENE PATERSON OPFERMAN.

REFERENCES CITED

The following references are of record in the file of this patent:

UNITED STATES PATENTS

| Number | Name | Date |
| --- | --- | --- |
| 2,294,937 | Ruskin | Sept. 8, 1942 |
| 2,213,977 | Christiansen | Sept. 10, 1940 |
| 2,132,662 | Volwiler | Oct. 11, 1938 |
| 2,140,989 | Eisenbrand | Dec. 20, 1936 |
| 2,249,903 | Ludwig | July 22, 1941 |

OTHER REFERENCES

American Druggist, page 44, Dec. 1942.
American Druggist, page 56, Oct. 1942.
Abstracts of J. of American Pharm. Assoc., 1941, page 350.